(12) United States Patent
Schoeny

(10) Patent No.: US 11,039,565 B2
(45) Date of Patent: Jun. 22, 2021

(54) SYSTEM AND METHOD FOR CONTROLLING THE OPERATION OF ROTATING GROUND-ENGAGING COMPONENTS OF AN AGRICULTURAL IMPLEMENT BASED ON THE ROTATIONAL SPEEDS OF SUCH COMPONENTS

(71) Applicant: CNH Industrial America LLC, New Holland, PA (US)

(72) Inventor: Christopher Schoeny, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 228 days.

(21) Appl. No.: 16/394,266

(22) Filed: Apr. 25, 2019

(65) Prior Publication Data

US 2020/0337213 A1   Oct. 29, 2020

(51) Int. Cl.
*A01B 79/02*   (2006.01)
*A01C 5/06*   (2006.01)
*A01B 63/24*   (2006.01)

(52) U.S. Cl.
CPC .............. *A01B 79/02* (2013.01); *A01B 63/24* (2013.01); *A01C 5/064* (2013.01)

(58) Field of Classification Search
None
See application file for complete search history.

(56) References Cited

U.S. PATENT DOCUMENTS

| 6,863,006 B2 | 3/2005 | Sandoval et al. |
| 8,408,149 B2 | 4/2013 | Rylander |

(Continued)

FOREIGN PATENT DOCUMENTS

| DE | 3608456 C2 | 4/1995 |
| GB | 1104723 A | 2/1968 |
| JP | H10248325 A | 9/1998 |

OTHER PUBLICATIONS

Ahmad, Fiaz et al. "Forces and Straw Cutting Performance of Double Disc Furrow Opener in No-Till Paddy Soil," PLoS One, Mar. 30, 2015, 17 pages.

(Continued)

*Primary Examiner* — Thomas B Will
*Assistant Examiner* — Ian Alexander Normile
(74) *Attorney, Agent, or Firm* — Rebecca L. Henkel; Rickard K. DeMille

(57) ABSTRACT

In one aspect, a system for controlling the operation of rotating ground-engaging components of an agricultural implement may include a rotating ground-engaging component configured to rotate relative to soil within a field as the agricultural implement is moved across the field. The system may also include a rotational speed sensor configured to capture data indicative of a rotational speed of the ground-engaging component. A controller of the system may be configured to monitor a first-order derivative of the rotational speed of the ground-engaging component based on data received from the rotational speed sensor. Moreover, the controller may be configured to determine when a frequency of the monitored first-order derivative falls outside of a predetermined frequency range. Additionally, the controller may be configured to initiate an adjustment of an operating parameter of the ground-engaging component to return the frequency of the first-order derivative to within the predetermined frequency range.

20 Claims, 5 Drawing Sheets

(56) References Cited

U.S. PATENT DOCUMENTS

| | | | |
|---|---|---|---|
| 8,448,587 B2 | 5/2013 | Kowalchuk | |
| 9,485,900 B2* | 11/2016 | Connell | A01B 21/08 |
| 9,723,778 B2 | 8/2017 | Bassett | |
| 9,968,033 B2 | 5/2018 | Dunn et al. | |
| 10,064,322 B2 | 9/2018 | Janelle et al. | |
| 10,091,926 B2* | 10/2018 | Maro | A01C 7/205 |
| 2012/0291680 A1* | 11/2012 | Rylander | A01C 7/006 111/139 |
| 2018/0206393 A1* | 7/2018 | Stoller | A01B 35/32 |
| 2018/0317380 A1 | 11/2018 | Bassett | |
| 2019/0045703 A1 | 2/2019 | Bassett | |
| 2019/0239413 A1* | 8/2019 | DeGarmo | A01B 21/08 |

OTHER PUBLICATIONS

Jing, Lin et al. "Simulation and Validation of Seeding Depth Mathematical Model of 2BG-2 Type Corn Ridge Planting No-Till Planter," Transactions of the Chinese Society of Agricultural Engineering, vol. 31 No. 9, May 2015, 6 pages.

* cited by examiner

SYSTEM AND METHOD FOR CONTROLLING THE OPERATION OF ROTATING GROUND-ENGAGING COMPONENTS OF AN AGRICULTURAL IMPLEMENT BASED ON THE ROTATIONAL SPEEDS OF SUCH COMPONENTS

FIELD OF THE INVENTION

The present disclosure generally relates to agricultural implements and, more particularly, to systems and methods for controlling the operation of rotating ground-engaging components of an agricultural implement based on the first-order derivatives of the rotational speeds of such components.

BACKGROUND OF THE INVENTION

Modern farming practices strive to increase yields of agricultural fields. In this respect, certain agricultural implements, such as seed-planting implements, are towed behind a tractor or other work vehicle to disperse seed throughout a field. A seed-planting implement typically includes one or more rotating ground-engaging components configured to rotate or roll relative to the soil as the implement is moved across a field. For example, in certain configurations, the implement may include one or more disc openers that form a furrow or trench within the soil while rotating relative to the soil. Furthermore, the implement may also include one or more closing discs that close the furrow while rotating relative to the soil. Additionally, the implement may include one or more residue removal devices that sweep residue and dirt clods out of the path of the disc opener(s). In this regard, the function(s) of the rotating ground-engaging component(s) requires or relies upon rotation of the component(s) relative to the soil. As such, the rotational speed(s) of the rotating ground-engaging component(s) may be indicative of the performance of such component(s).

Accordingly, an improved system and method for controlling the operation of rotating ground-engaging components of an agricultural implement would be welcomed in the technology. In particular, a system and method for controlling the operation of rotating ground-engaging components of an agricultural implement based on the rotational speeds of such components would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of rotating ground-engaging components of an agricultural implement. The system may include a rotating ground-engaging component configured to rotate relative to soil within a field as the agricultural implement is moved across the field. The system may also include a rotational speed sensor configured to capture data indicative of a rotational speed of the rotating ground-engaging component. Furthermore, the system may include a controller communicatively coupled to the rotational speed sensor. The controller may be configured to monitor a first-order derivative of the rotational speed of the rotating ground-engaging component based on data received from the rotational speed sensor. Moreover, the controller may be configured to determine when a frequency of the monitored first-order derivative falls outside of a predetermined frequency range. Additionally, the controller may be configured to initiate an adjustment of an operating parameter of the rotating ground-engaging component to return the frequency of the first-order derivative to within the predetermined frequency range.

In another aspect, the present subject matter is directed to a method for controlling the operation of rotating ground-engaging components of an agricultural implement. The agricultural implement may include a rotating ground-engaging component configured to rotate relative to soil within a field as the agricultural implement is moved across the field. The method may include monitoring, with one or more computing devices, a first-order derivative of a rotational speed of the rotating ground-engaging component. The method may also include determining, with the one or more computing devices, when a frequency of the monitored first-order derivative falls outside of a predetermined frequency range. Furthermore, the method may include initiating, with the one or more computing devices, an adjustment of a rotating ground-engaging component operating parameter to return the frequency of the first-order derivative to within the predetermined frequency range.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
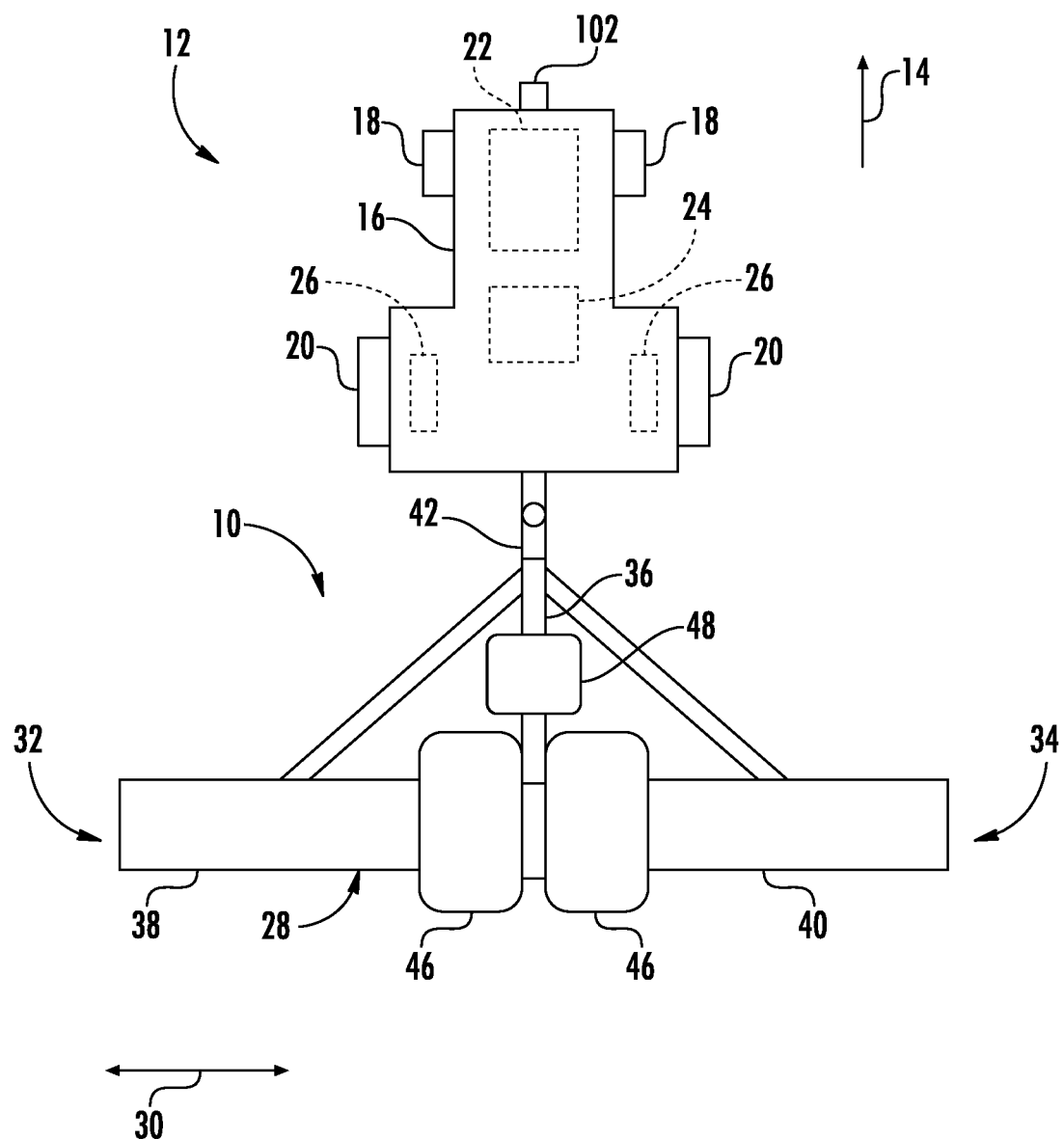
FIG. 1 illustrates a top view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of rotating ground-engaging components of an agricultural implement. Specifically, in several embodiments, the system may include one or more rotational speed sensors, with each sensor configured to capture data indicative of the rotational speed of a rotating ground-engaging component of the implement (e.g., a gauge wheel, disc opener, closing disc, press wheel, residue removal wheel, and/or the like). During normal operation of the implement (e.g., when the rotating ground-engaging component(s) are not plugged), the frequency of the first-order derivative of the rotational speed of each rotating ground-engaging component may fluctuate within a predetermined frequency range. However, when a rotating ground-engaging component is in the process of becoming plugged, the frequency of the first-order derivative of its rotational speed may fall outside of the predetermined frequency range. As such, a controller of the disclosed system may be configured to monitor the first-order derivative(s) of the rotational speed(s) of the rotating ground-engaging component(s) based on data received from the rotational speed sensor(s).

In accordance with aspects of the present subject matter, the controller may be configured to determine when the frequency(ies) of the monitored first-order derivative(s) falls outside of the predetermined frequency range. In such instances, as indicated above, the corresponding rotating ground-engaging component(s) may be in the process of becoming plugged. Thereafter, the controller may be configured to initiate an adjustment of one or more operating parameters of the corresponding rotating ground-engaging component(s) to return the monitored frequency(ies) to within the frequency range. For example, in one embodiment, controller may be configured to initiate an adjustment of the force applied to and/or a penetration depth of the rotating ground-engaging component(s).

Figure 2:
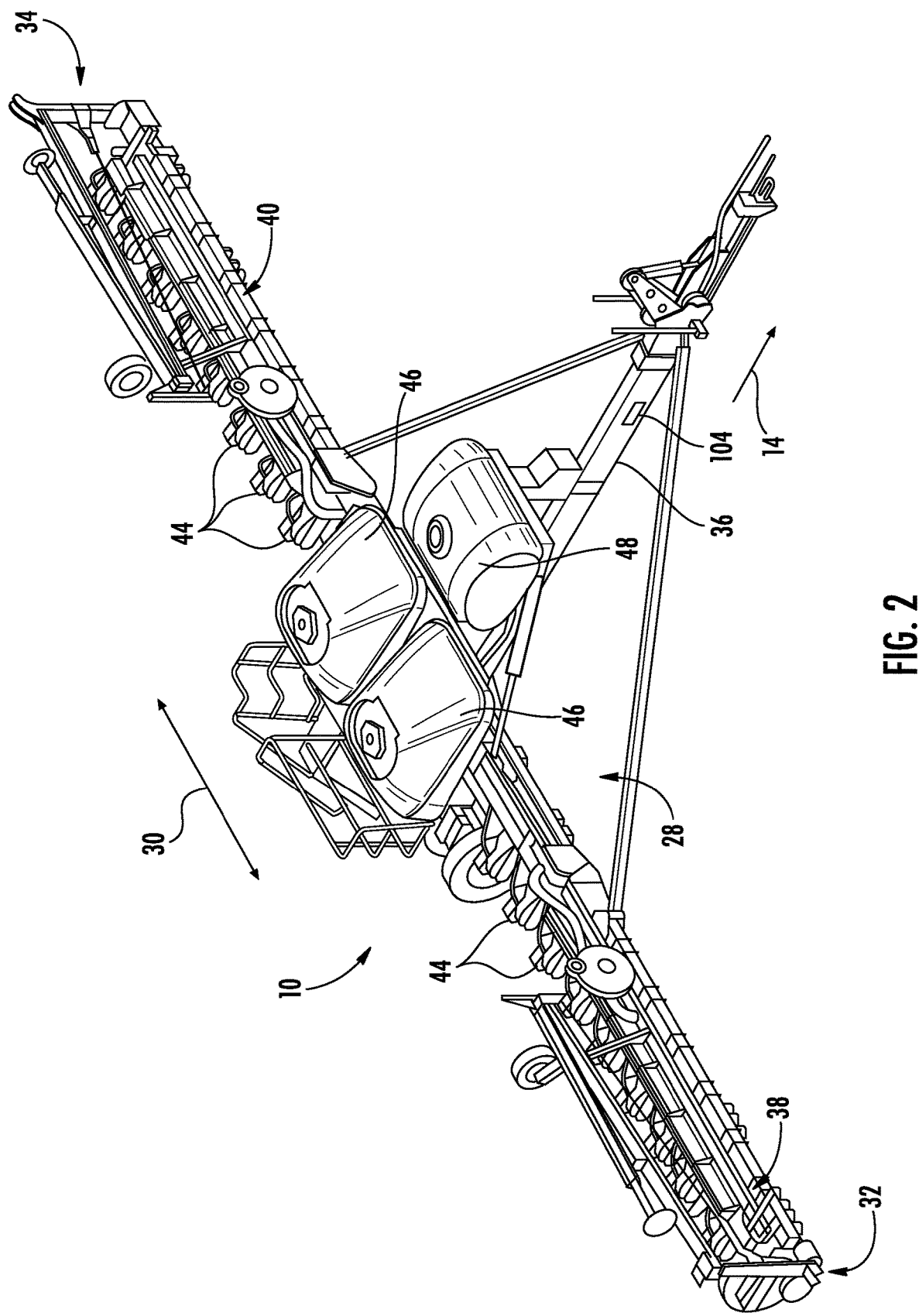
FIG. 2 illustrates a perspective view of the agricultural implement shown in FIG. 1, particularly illustrating various components of the implement.

Referring now to the drawings, FIGS. 1 and 2 illustrate differing views of one embodiment of an agricultural implement 10 in accordance with aspects of the present subject matter. Specifically, FIG. 1 illustrates a top view of the implement 10 coupled to a work vehicle 12. Additionally, FIG. 2 illustrates a perspective view of the implement 10, particularly illustrating various components of the implement 10.

In general, the vehicle 12 may be configured to tow the implement 10 across a field in a direction of travel (e.g., as indicated by arrow 14 in FIG. 1). As shown, in the illustrated embodiment, the implement 10 is configured as a seed-planting implement (e.g., a seed disc drill), and the vehicle 12 is configured as an agricultural tractor. However, in alternative embodiments, the implement 10 may be configured as any other suitable type of implement, such as a side dresser or another fertilizer-dispensing implement, a strip tiller, a tillage implement (e.g., a disc harrow), and/or the like. Similarly, the vehicle 12 may be configured as any other suitable type of vehicle, such as an agricultural harvester, a self-propelled sprayer, and/or the like.

As shown in FIG. 1, the vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the vehicle 12 relative to the ground and move the vehicle 12 in the direction of travel 14 across the field. However, in alternative embodiments, the front wheels 18 may be driven in addition to or in lieu of the rear wheels 20. Additionally, in further embodiments, the vehicle 12 may include track assemblies (not shown) in place of the front and/or rear wheels 18, 20.

Furthermore, the vehicle 12 may include one or more devices for adjusting the speed at which the vehicle 12 moves across the field in the direction of travel 14. Specifically, in several embodiments, the work vehicle 12 may include an engine 22 and a transmission 24 mounted on the frame 16. In general, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine 22 to the driven wheels 20. For example, increasing the power output by the engine 22 (e.g., by increasing the fuel flow to the engine 22) and/or shifting the transmission 24 into a higher gear may increase the speed at which the vehicle 12 moves across the field. Conversely, decreasing the power output by the engine 22 (e.g., by decreasing the fuel flow to the engine 22) and/or shifting the transmission 24 into a lower gear may decrease the speed at which the vehicle 12 moves across the field.

Additionally, the vehicle 12 may include one or more braking actuators 26 that, when activated, reduce the speed at which the vehicle 12 moves across the field, such as by converting energy associated with the movement of the vehicle 12 into heat. For example, in one embodiment, the braking actuator(s) 26 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, it should be appreciated that the braking actuator(s) 26 may any other suitable hydraulic, pneumatic, mechanical, and/or electrical component(s) configured to convert the rotation of the rotating element(s) into heat. Furthermore, although FIG. 1 illustrates one braking actuator 26 provided in operative association with each of the driven wheels 20, the vehicle 12 may include any other suitable number of braking actuators 26. For example, in one embodiment, the vehicle 12 may include one braking actuator 26 provided in operative association with each of the steerable wheels 18 in addition to or in lieu of the driven wheels 20.

Moreover, as shown in FIG. 1, an organic matter sensor 102 may be provided in operative association with the implement 10 and/or the vehicle 12. For instance, as shown in FIG. 1, the organic matter sensor 102 is installed on or within the vehicle 12. However, in other embodiments, the organic matter sensor 102 may be installed on or within the implement 10. In general, the organic matter sensor 102 may be configured to capture data indicative of the organic matter content (e.g., the percent organic matter content) of the soil within the field across which the implement/vehicle 10/12 is traveling. For example, in one embodiment, the organic matter sensor 102 may be configured as an optical sensor configured to detect one or more characteristics of light reflected by the organic matter within the soil. However, in alternative embodiments, the organic matter sensor 102 may be configured as any other suitable device for sensing or detecting the organic matter content of the soil.

Referring still to FIGS. 1 and 2, the implement 10 may include a frame or toolbar 28 configured to support and/or couple to one or more components of the implement 10. Specifically, in several embodiments, the toolbar 28 may extend along a lateral direction 30 between a first side 32 of the implement 10 and a second side 34 of the implement 10. As shown, the toolbar 28 may include a center section 36 and a pair of wing sections 38, 40. In one embodiment, the wing sections 38, 40 may be pivotably coupled to the center section 36 in a manner that permits the wing sections 38, 40 to fold forward to reduce the lateral width of the implement 10, such as during storage or transportation of the implement 10 on a road. Furthermore, a tow bar 42 may be coupled to the center section 36 to allow the implement 10 to be towed by the work vehicle 12. Additionally, as shown in FIG. 2, the wing sections 38, 40 may generally be configured to support a plurality of row units (or seed-planting units) 44. Each row unit 44 may, in turn, be configured to deposit seeds at a desired depth beneath the soil surface and at a desired seed spacing as the implement 10 is being towed by the vehicle 12, thereby establishing rows of planted seeds. In some embodiments, the bulk of the seeds to be planted may be stored in one or more hoppers or seed tanks 46 mounted on or otherwise supported by the toolbar 28. Thus, as seeds are planted by the row units 44, a pneumatic distribution system (not shown) may distribute additional seeds from the seed tanks 46 to the individual row units 44. Additionally, one or more fluid tanks 48 mounted on or otherwise supported by the toolbar 28 may store agricultural fluids, such as insecticides, herbicides, fungicides, fertilizers, and/or the like, which may be sprayed onto the seeds during planting.

It should be appreciated that, for purposes of illustration, only a portion of the row units 44 of the implement 10 have been shown in FIG. 2. In general, the implement 10 may include any number of row units 44, such as six, eight, twelve, sixteen, twenty-four, thirty-two, or thirty-six row units. In addition, it should be appreciated that the lateral spacing between row units 44 may be selected based on the type of crop being planted. For example, the row units 44 may be spaced approximately thirty inches from one another for planting corn, and approximately fifteen inches from one another for planting soybeans.

Furthermore, a soil moisture sensor 104 may be provided operative association with the implement 10. For instance, as shown in FIG. 2, the soil moisture sensor 104 is installed on or within the implement 10. However, in other embodiments, the soil moisture sensor 104 may be installed on or within the vehicle 12. In general, the soil moisture sensor 104 may be configured to capture data indicative of the moisture content of the soil within the field across which the implement/vehicle 10/12 is being moved. For example, in one embodiment, the soil moisture sensor 104 may be configured as an optical sensor configured to detect one or more characteristics of light reflected by the soil, with such characteristics generally being indicative of the soil moisture content. However, it should be appreciated that, in alternative embodiments, the soil moisture sensor 104 may be configured as any other suitable device for sensing or detecting the moisture content of the soil.

Figure 3:
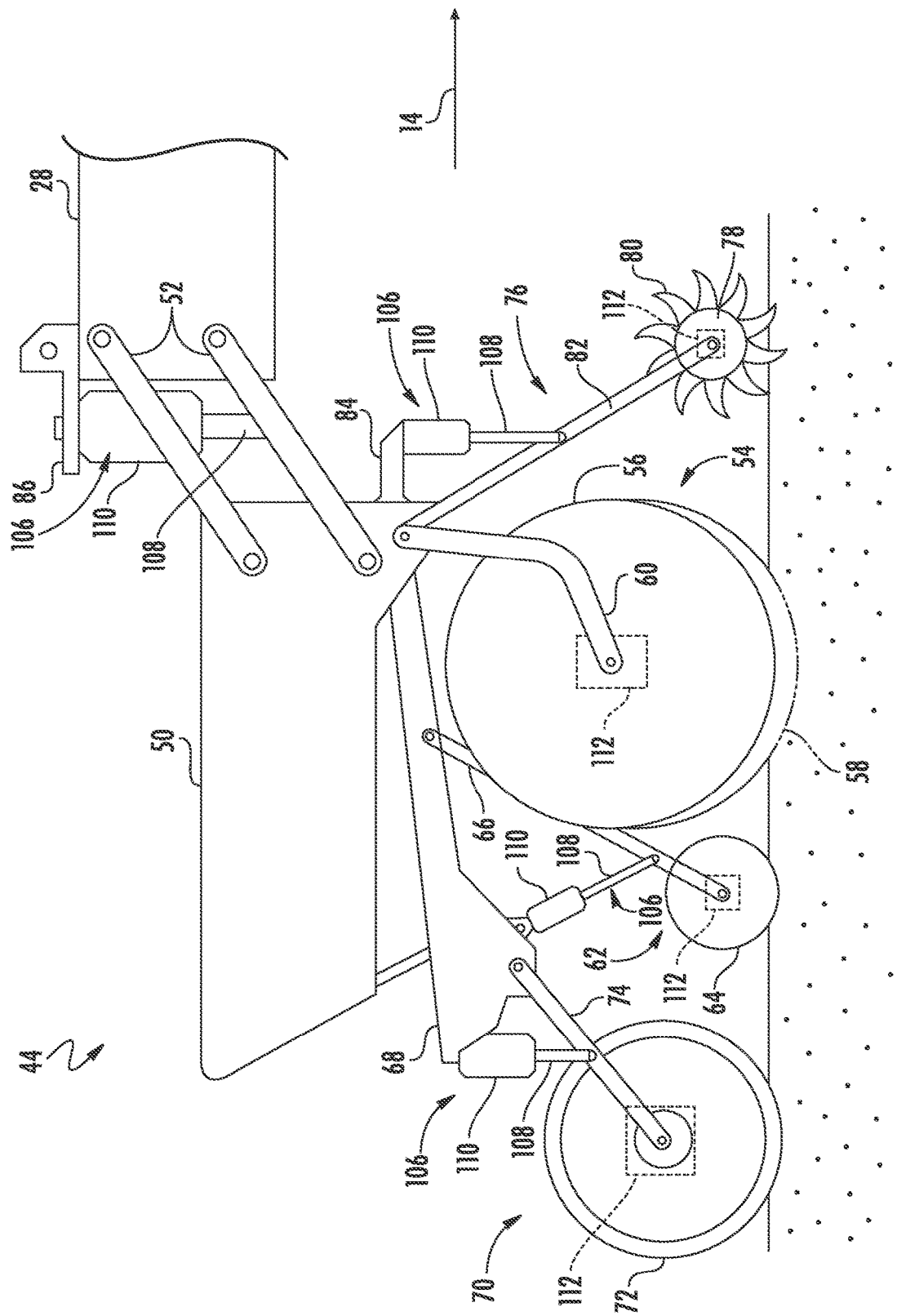
FIG. 3 illustrates a side view of one embodiment of a row unit of an agricultural implement in accordance with aspects of the present subject matter.

Referring now to FIG. 3, a side view of one embodiment of a row unit 44 is illustrated in accordance with aspects of the present subject matter. As shown, the row unit 44 may include a frame 50 adjustably coupled to the toolbar 28 by links 52. For example, one end of each link 52 may be pivotably coupled to the frame 50, while an opposed end of each link 52 may be pivotably coupled to the toolbar 28. In one embodiment, the links 52 may be parallel. However, in alternative embodiments, the row unit 44 may be coupled to the toolbar 28 in any other suitable manner.

As shown in FIG. 3, the row unit 44 also includes a furrow opening assembly 54. For example, in one embodiment, the furrow opening assembly 54 may include a gauge wheel 56 and one or more disc openers 58 configured to excavate a furrow or trench in the soil. In general, the gauge wheel 56 may be configured to engage the top surface of the soil as the implement 10 is moved across the field. As such, the height of the disc opener(s) 58 may be adjusted with respect to the position of the gauge wheel 56 to set the desired depth of the furrow being excavated. Furthermore, the furrow opening assembly 54 may include a support arm 60 configured to couple the gauge wheel 56 to the frame 50. For example, one end of the support arm 60 may be pivotably coupled to the gauge wheel 56, while an opposed end of the support arm 60 may be pivotably coupled to the frame 50. Additionally, the disc opener(s) 58 may be coupled (e.g., bolted) to the frame 50. However, in alternative embodiments, the gauge wheel 56 and the disc opener(s) 58 may be coupled to the frame 50 in any other suitable manner.

Moreover, as shown, the row unit 44 may include a furrow closing assembly 62. Specifically, in several embodiments, the furrow closing assembly 62 may include a pair of closing discs 64 (only one of which is shown) positioned relative to each other in a manner that permits soil to flow between the discs 64 as the implement 10 is being moved across the field. As such, the closing discs 64 may be configured to close the furrow after seeds have been deposited therein, such as by pushing the excavated soil into the furrow. Furthermore, the furrow closing assembly 62 may include a support arm 66 configured to adjustably couple the closing discs 64 to the frame 50. For example, one end of the support arm 66 may be pivotably coupled to the closing discs 64, while an opposed end of the support arm 66 may be pivotably coupled to a chassis arm 68, which is, in turn, coupled to the frame 50. However, in alternative embodiments, the closing discs 64 may be coupled to the frame 50 in any other suitable manner. Furthermore, in alternative embodiments, the furrow closing assembly 62 may include any other suitable number of closing discs 64, such as one closing disc 64 or three or more closing discs 64.

Additionally, the row unit 44 may include a press wheel assembly 70. Specifically, in several embodiments, the press wheel assembly 70 may include a press wheel 72 configured to roll over the closed furrow to firm the soil over the seed and promote favorable seed-to-soil contact. Furthermore, the press wheel assembly 70 may include a support arm 74 configured to adjustably couple the press wheel 72 to the frame 50. For example, one end of the support arm 74 may be pivotably coupled to the press wheel 72, while an opposed end of the support arm 74 may be pivotably coupled to the chassis arm 68, which is, in turn, coupled to the frame 50. However, in alternative embodiments, the press wheel 72 may be coupled to the frame 50 in any other suitable manner.

Furthermore, in one embodiment, a residue removal device 76 may be positioned at the forward end of the row unit 44 relative to the direction of travel 14. In this regard, the residue removal device 76 may be configured to break up and/or sweep away residue, dirt clods, and/or the like from the path of the row unit 44 before the furrow is formed in the soil. For example, in one embodiment, the residue removal device 76 may include one or more residue removal wheels 78, with each wheel 78 having a plurality of tillage points or fingers 80. As such, the wheel(s) 78 may be configured to roll relative to the soil as the implement 10 is moved across the field such that the fingers 80 break up and/or sweep away residue and dirt clods. Additionally, the residue removal device 76 may include a support arm 82 configured to adjustably couple the residue removal wheel(s) 78 to the frame 50. For example, one end of the support arm 82 may be pivotably coupled to the wheel(s) 78, while an opposed end of the support arm 82 may be pivotably coupled to the frame 50. However, in alternative embodiments, the residue removal wheel(s) 78 may be coupled to the frame 50 in any other suitable manner. Furthermore, although only one residue removal wheel 78 is shown in FIG. 3, it should be appreciated that, in alternative embodiments, the residue removal device 76 may include any other suitable number of residue removal wheels 78. For example, in one embodiment, the residue removal device 76 may include a pair of residue removal wheels 78.

In several embodiments, the implement 10 may include one or more actuators 106. Specifically, each actuator 106 may be configured to adjust to the position of a rotating ground-engaging component of the implement 10 relative to the frame 50 and/or toolbar 28 and/or apply a force to the rotating ground-engaging component. As used herein, a rotating ground-engaging component may be any component of the implement 10 configured to rotate relative to the soil as the implement 10 is moved across a field. For example, in one embodiment, a first end of each actuator 106 (e.g., a rod 108 of each actuator 106) may be coupled to a component on which the rotating ground-engaging component is mounted (e.g., the arms 66, 74, 82 and the links 52). A second end of each actuator 106 (e.g., the cylinder 110 of each actuator 106) may be coupled to the frame 50 (e.g., via the chassis arm 68 or a bracket 84) or the toolbar 28 (e.g., via a bracket 86). As such, the rod 108 of each actuator 106 may be configured to extend and/or retract relative to the corresponding cylinder 108 to adjust the position of the associated rotating ground-engaging component. Furthermore, the actuator(s) 106 may be configured to apply a force to associated rotating ground-engaging component, which may, in turn, cause the component to exert a pressure on the soil. In one embodiment, the actuator(s) 106 corresponds to a fluid-driven actuator(s), such as a hydraulic or pneumatic cylinder(s). However, in alternative embodiments, the actuator(s) 106 may correspond to any other suitable type of actuator(s), such as an electric linear actuator(s). Furthermore, it should be appreciated that, in alternative embodiments, the actuator(s) 106 may be configured to adjust to the position(s) of and/or apply a force to any other suitable rotating ground-engaging component(s) of the implement 10.

As shown in FIG. 3, the actuator(s) 106 may be configured to adjust the position of and/or apply a force to any number of rotating ground-engaging components of the row unit 44. Specifically, in several embodiments, the actuator(s) 106 may configured to apply a force to one or more rotating ground-engaging components of the furrow-opening assembly 54, the furrow-closing assembly 62, the press wheel assembly 70, and/or the residue removal device 76. For instance, as shown in the illustrated embodiment, an actuator 106 may configured to apply a force to the gauge wheel 56 (e.g., by applying a force to the frame 50, such as via the links 52), the closing disc(s) 64, the press wheel 72, and the residue removal wheel(s) 78. Furthermore, in the illustrated embodiment, the actuators 106 may configured to adjust the penetration depth of the closing disc(s) 64. Alternatively, the actuator(s) 106 may be provided in operative association with any other suitable rotating ground-engaging components of the implement 10.

In accordance with aspects of the present subject matter, the implement 10 may include one or more rotational speed sensors 112. Specifically, each rotational speed sensor 112 may be configured to capture data indicative of the rotational speed of an associated rotating ground-engaging component of the implement 10. For example, in one embodiment, each rotational speed sensor 112 may correspond to a Hall Effect sensor configured to detect the rotational speed of the associated rotating ground-engaging component. However, it should be appreciated that, in alternative embodiments, the rotational speed sensor(s) 112 may be configured as any other suitable device(s) for sensing or detecting the rotational speed(s) or position(s) of the one or more rotating ground-engaging component(s) of the implement 10.

Furthermore, as shown in FIG. 3, the rotational speed sensor(s) 112 may be provided in operative association with any number of rotating ground-engaging components of the implement 10. Specifically, in several embodiments, the rotational speed sensor(s) 112 may be provided in operative association with one or more rotating ground-engaging components of the furrow-opening assembly 54, the furrow-closing assembly 62, the press wheel assembly 70, and/or the residue removal device 76. For instance, as shown in the illustrated embodiment, a rotational speed sensor 112 may be provided in operative association with the gauge wheel 56, one of the closing discs 64, the press wheel 72, and one of the residue removal wheels 78. Alternatively, the rotational speed sensor(s) 112 may be provided in operative association with any other suitable rotating ground-engaging components of the implement 10, such as the disc opener(s) 58, additional closing discs 64 or residue removal wheels 76, closing wheels (not shown), fertilizer coulters (not shown), and/or the like. Furthermore, in embodiments in which the implement 10 is configured as a tillage implement, the rotational speed sensor(s) 112 may be provided in operative association with any suitable discs, coulters, closing wheels, and/or the like.

It should be further appreciated that the configuration of the agricultural implement 10 and the work vehicle 12 described above and shown in FIGS. 1-3 is provided only to place the present subject matter in an exemplary field of use. Thus, it should be appreciated that the present subject matter may be readily adaptable to any manner of implement and/or vehicle configuration.

Figure 4:
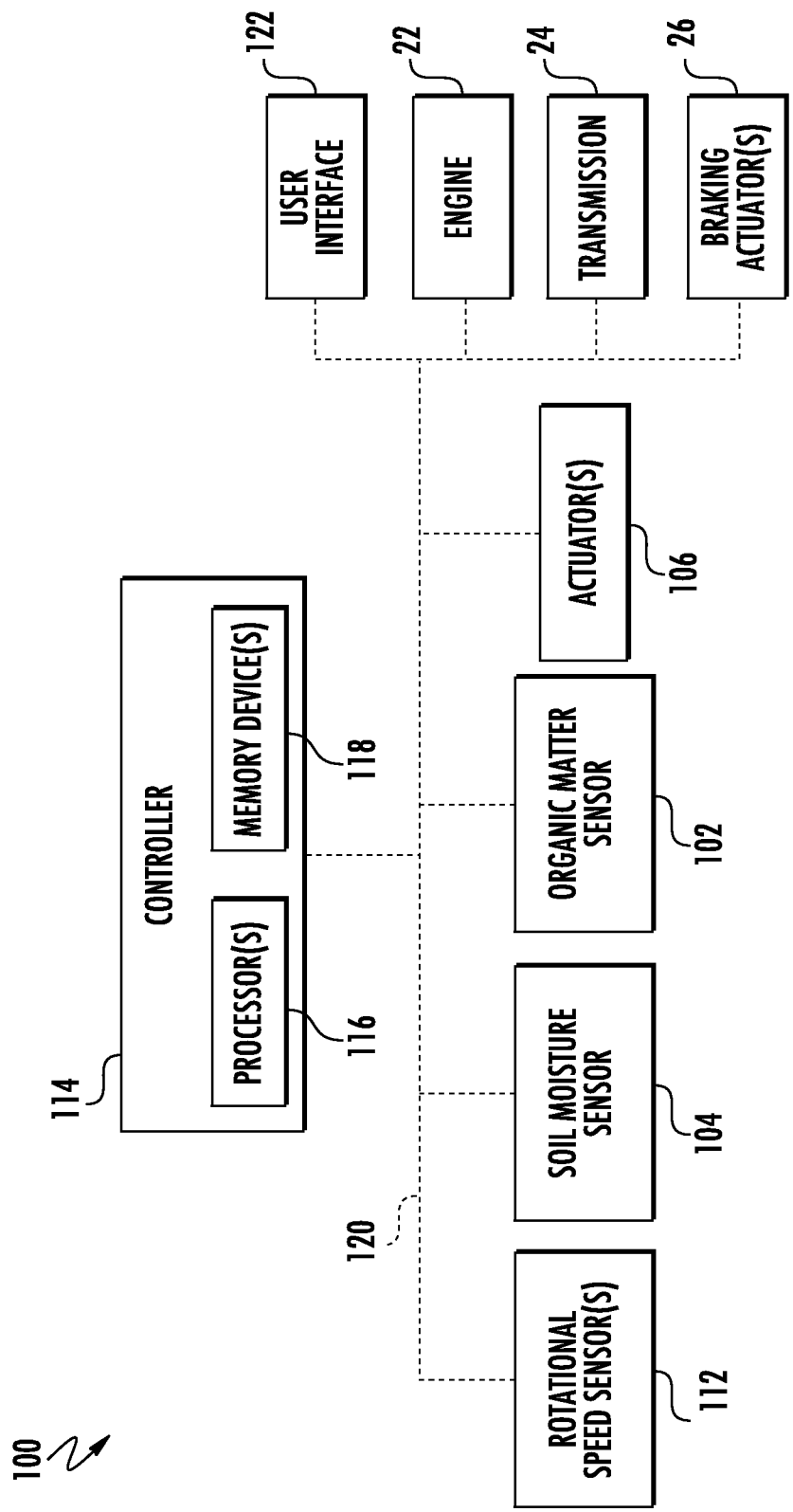
FIG. 4 illustrates a schematic view of one embodiment of a system for controlling the operation of rotating ground-engaging components of an agricultural implement in accordance with aspects of the present subject matter.

Referring now to FIG. 4, a schematic view of one embodiment of a system 100 for controlling the operation of rotating ground-engaging components of an agricultural implement is illustrated in accordance with aspects of the present subject matter. In general, the system 100 will be described herein with reference to the agricultural implement 10 and the work vehicle 12 described above with reference to FIGS. 1-3. However, it should be appreciated by those of ordinary skill in the art that the disclosed system 100 may generally be utilized with implements having any other suitable implement configuration and/or vehicles having any other suitable vehicle configuration.

As shown in FIG. 4, the system 100 may include a controller 114 positioned on and/or within or otherwise associated with the implement 10 or the vehicle 12. In general, the controller 114 may comprise any suitable processor-based device known in the art, such as a computing device or any suitable combination of computing devices. Thus, in several embodiments, the controller 114 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller 114 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 118 may generally be configured to store suitable computer-readable instructions that, when implemented by the processor(s) 116, configure the controller 114 to perform various computer-implemented functions.

In addition, the controller 114 may also include various other suitable components, such as a communications circuit or module, a network interface, one or more input/output channels, a data/control bus and/or the like, to allow controller 114 to be communicatively coupled to any of the various other system components described herein (e.g., the sensors 102, 104, 112, the actuator(s) 106, and the vehicle components 22, 24, 26). For instance, as shown in FIG. 4, a communicative link or interface 120 (e.g., a data bus) may be provided between the controller 114 and the components 22, 24, 26, 102, 104, 106, 112 to allow the controller 114 to communicate with such components 22, 24, 26, 102, 104, 106, 112 via any suitable communications protocol (e.g., CANBUS).

It should be appreciated that the controller 114 may correspond to an existing controller(s) of the implement 10 and/or the vehicle 12, itself, or the controller 114 may correspond to a separate processing device. For instance, in one embodiment, the controller 114 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 114 may be performed by a single processor-based device or may be distributed across any number of processor-based devices, in which instance such devices may be considered to form part of the controller 114. For instance, the functions of the controller 114 may be distributed across multiple application-specific controllers, such as an engine controller, an implement controller, and/or the like.

Furthermore, in one embodiment, the system 100 may also include a user interface 122. More specifically, the user interface 122 may be configured to provide feedback (e.g., feedback or input associated with the operation of the rotating ground-engaging components) to the operator of the implement/vehicle 10/12. As such, the user interface 122 may include one or more feedback devices (not shown), such as display screens, speakers, warning lights, and/or the like, which are configured to provide feedback from the controller 114 to the operator. The user interface 122 may, in turn, be communicatively coupled to the controller 114 via the communicative link 120 to permit the feedback to be transmitted from the controller 114 to the user interface 122. In addition, some embodiments of the user interface 122 may include one or more input devices (not shown), such as touchscreens, keypads, touchpads, knobs, buttons, sliders, switches, mice, microphones, and/or the like, which are configured to receive user inputs from the operator. In one embodiment, the user interface 122 may be mounted or otherwise positioned within a cab (not shown) of the vehicle 12. However, in alternative embodiments, the user interface 122 may mounted at any other suitable location.

In several embodiments, the controller 114 may be configured to monitor the first-order derivative(s) of the acceleration(s) of one or more rotating ground-engaging components. As described above, the implement 10 may include one or more rotational sensors 112, with each sensor 112 configured to capture data indicative of the rotational speed of one of the rotating ground-engaging components of the implement 10 (e.g., one of the gauge wheels 56, closing discs 64, press wheels 72, or residue removal wheels 78). In this regard, as the implement 10 is moved across the field, the controller 114 may receive the sensor data from the sensor(s) 112 (e.g., via the communicative link 120. Thereafter, the controller 114 may be configured to process/analyze the received sensor data to determine or estimate the first-order derivative values associated with the rotational speed(s) of the rotating ground-engaging component(s). For instance, the controller 114 may include a look-up table(s), suitable mathematical formula, and/or algorithms stored within its memory device(s) 118 that correlates the received sensor data to the first-order derivative values of the rotational speed(s) of the rotating ground-engaging component(s). The monitored first-order derivative values may then be stored within the memory device(s) 118 of the controller 114 or transmitted to the user interface 122 (e.g., via the communicative link 120) for display to the operator.

When a rotating ground-engaging component of the implement is not plugged or in the process of becoming plugged, the frequency of the first-order derivative of its rotational speed may generally be within a predetermined frequency range. More specifically, as the implement 10 is moved across the field, the rotating ground-engaging component may engage the soil such that the component rotates relative to the soil. Such engagement between the rotating ground-engaging component and the soil may cause the component to alternatingly stick to the soil and slip relative to the soil such that the component experiences a cyclical acceleration or first-order derivative of its rotation speed. When the rotating ground-engaging component is in a steady state and the soil conditions (e.g., soil moisture, texture, type, stickiness, and/or the like) are consistent across the field, the frequency of the acceleration of the component is generally consistent. As such, the first-order derivative of the rotational speed of the rotating ground-engaging component may generally fluctuate within a predetermined frequency range as the implement 10 is moved across the field.

However, when the rotating ground-engaging component is in the process of becoming plugged, the frequency of the first-order derivative of its rotational speed may fall outside of the predetermined frequency range. In general, the rotating ground-engaging component may be in the process of becoming plugged when enough soil and/or residue accumulates on and/or around the component, thereby impeding its operation. More specifically, the accumulated soil/residue may cause the rotating ground-engaging component to alternatingly accelerate and decelerate much more aggressively than the contact with the soil alone such that rotational speed of the component becomes erratic. In such instances, the frequency of the first-order derivative of its rotational speed may fall outside of the predetermined frequency range. Moreover, the amplitude of the first-order derivative of the rotating ground-engaging component (e.g., the peak to peak distance of the acceleration signal) may be significantly higher when the component is plugged. As will be described below, when the rotating ground-engaging component becomes plugged, the accumulated soil/residue may cause the rotation of the component to halt such that the monitored frequency is zero.

Furthermore, in several embodiments, the controller 114 may be configured to determine when the frequency(ies) of the monitored first-order derivative(s) falls outside of an associated predetermined frequency range. Specifically, in one embodiment, the controller 114 may be configured to determine or estimate the frequency(ies) of the monitored first-order derivative(s). For instance, the controller 114 may include suitable algorithm(s) stored within its memory device(s) 118 that, when executed by the processor(s) 116, allow the controller 114 to calculate or otherwise determine the frequency(ies) of the monitored first-order derivative(s). Thereafter, the controller 114 may be configured to compare the values associated with the determined frequency(ies) to the associated predetermined frequency range to determine when the frequency(ies) of the monitored first-order derivative(s) fall outside of the range.

It should be appreciated that each rotating ground-engaging component may have a particular associated predetermined frequency range. Specifically, in one embodiment, each type of rotating ground-engaging component may have its own predetermined frequency range. For example, in the illustrated embodiment, the gauge wheel(s) 56, closing disc(s) 64, the press wheel(s) 72, and the residue removal wheel(s) 78 may each have an associated predetermined frequency range. However, in alternative embodiments, any other suitable predetermined frequency range(s) may be used.

Additionally, the controller 114 may be configured to initiate an adjustment of one or more operating parameter(s) of the rotating ground-engaging component(s) to return the frequency(ies) of the monitored first-order derivative(s) to within the predetermined frequency range. Specifically, in several embodiments, when the frequency of the monitored first-order derivative of one of the rotating ground-engaging components falls outside of the associated predetermined frequency range, the controller 114 may be configured to control the operation of the associated actuator 106 to adjust one or more operating parameters of that component. For example, in one embodiment, the controller 114 may be configured to transmit instructions to the associated actuator 106 (e.g., via the communicative link 120) instructing the actuator 106 to adjust the force applied to and/or the penetration depth of the corresponding rotating ground-engaging component. The force and/or penetration depth adjustment may, in turn, return the frequency of the monitored first-order derivative of the corresponding rotating ground-engaging component to within the associated predetermined frequency range. However, in alternative embodiments, the controller 114 may be configured to initiate an adjustment of any other suitable operating parameter(s) of the rotating ground-engaging component(s) when the frequency(ies) of the monitored first-order derivative of such component(s) falls outside of the associated predetermined frequency range.

Moreover, the controller 114 may be configured to determine that the rotating ground-engaging component(s) are plugged when the frequency of the monitored first-order derivative(s) is zero. In general, a rotating ground-engaging component may be plugged when enough soil and/or residue has accumulated on and/or around the component such that the component is unable to rotate relative to the soil. As indicated above, in such instances, the frequency of the first-order derivative of the rotational speed of the rotating ground-engaging component may be zero. In this regard, after initiating the operating parameter adjustment(s) to return the frequency(ies) of the monitored first-order derivative(s) to within the predetermined frequency range as described above, the controller 114 may be configured to continue monitoring the first-order derivative(s) of the rotational speed(s) of the rotating ground-engaging component(s). Thereafter, when the frequency of the monitored first-order derivative associated with any of the rotating ground-engaging component(s) is zero, the controller 114 may be configured to determine that such component(s) is plugged.

In addition, the controller 114 may be configured to initiate one or more control actions when it is determined that the rotating ground-engaging component(s) of the implement 10 is plugged. In general, such control action(s) may be associated with or otherwise intended to de-plug or otherwise remove soil accumulated on and/or around the rotating ground-engaging component(s). For example, in one embodiment, when it is determined that one or more rotating ground-engaging components of the implement 10 are plugged, the controller 114 may be configured to notify the operator of implement/vehicle 10/12 that the component(s) is plugged. Specifically, the controller 114 may be configured to transmit instructions to the user interface 122 (e.g., the communicative link 120) instructing the user interface 122 to provide a notification to the operator of the implement/vehicle 10/12 (e.g., by causing a visual or audible notification or indicator to be presented to the operator) indicating that the rotating ground-engaging component(s) is plugged. In such instances, the operator may then choose to initiate any suitable corrective action he/she believes is necessary, such as adjusting one or more operating parameters of the implement 10 and/or the vehicle 12.

Moreover, in several embodiments, the controller 114 may be configured to automatically adjust one or more operating parameters of the implement 10 and/or the vehicle 12 when it is determined that one or more rotating ground-engaging components of the implement 10 are plugged. Specifically, in one embodiment, the controller 114 may be configured to initiate adjustment of the force applied to and/or the penetration depth(s) of one or more rotating ground-engaging components of the implement 10. For example, the controller 114 may be configured transmit instructions to the actuator(s) 106 (e.g., via the communicative link 120) instructing the actuator(s) 106 to adjust the force applied to and/or the penetration depth(s) of associated rotating ground-engaging component(s).

Furthermore, in one embodiment, the controller 114 may be configured to automatically adjust the ground speed at which the implement/vehicle 10/12 is traveling across the field when it is determined one or more rotating ground-engaging components of the implement 10 are plugged. Specifically, the controller 114 may be configured to transmit instructions to the engine 22 and/or the transmission 24 (e.g., via the communicative link 120) instructing the engine 22 and/or the transmission 24 to adjust their operation. For example, the controller 114 may instruct the engine 22 to vary its power output and/or the transmission 24 to upshift or downshift to increase or decrease the ground speed of the implement/vehicle 10/12 in a manner that removes the accumulated soil/residue on the rotating ground-engaging component(s) or reduces further accumulation of soil/residue thereon. However, in alternative embodiments, the controller 114 may be configured to transmit instructions to any other suitable components (e.g., braking actuators 26) of the vehicle 12 and/or the implement 10 such that the ground speed of the implement/vehicle 10/12 is adjusted. Furthermore, it should be appreciated that any other suitable parameter(s) the implement 10 and/or the vehicle 12 may be adjusted when it is determined one or more rotating ground-engaging components of the implement 10 are plugged.

Furthermore, the controller 128 may be configured to monitor the soil moisture and/or organic matter content of the soil within the field across which the implement 10 is moved. As described above, in several embodiments, the implement 10 and/or the vehicle 12 may include an organic matter sensor 102 configured to capture data indicative of the organic matter content of the soil within the field. Moreover, in several embodiments, the implement 10 and/or the vehicle 12 may include a soil moisture sensor 104 configured to capture data indicative of the moisture content of the soil within the field. In this regard, as the implement/vehicle 10/12 is moved across the field, the controller 114 may receive the sensor data from the organic matter sensor 102 and/or the soil moisture sensor 104 (e.g., via the communicative link 120). Thereafter, the controller 114 may be configured to process/analyze the received sensor data to determine or estimate the organic matter content and/or soil moisture content of the soil within the field. For instance, the controller 114 may include a look-up table(s), suitable mathematical formula, and/or algorithms stored within its memory device(s) 118 that correlates the received sensor data to the organic matter and/or soil moisture content of the soil within the field. The monitored organic matter and/or soil moisture content data may then be stored within the memory device(s) 118 of the controller 114 or transmitted to the user interface 122 (e.g., via the communicative link 120) for display to the operator.

Moreover, the controller 114 may be configured to determine the stickiness of the soil within the field across which the implement/vehicle 10/12 are traveling. In general, the stickiness of the soil may generally correspond to any parameter indicative of the tendency of the soil within the field to stick to or otherwise adhere to the rotating ground-engaging component(s) of the implement 10. Specifically, the organic matter content and moisture content of the soil may, in turn, be indicative of the stickiness of the soil. For example, soils with greater organic matter and/or soil moisture contents may be stickier, while soils with lesser organic matter and/or soil moisture contents may be less sticky. Additionally, the frequency(ies) of the first-order derivative(s) of the rotational speed(s) of the rotating ground-engaging component(s) may also be indicative of the stickiness of the soil. For instance, the soil may be stickier when the frequency(ies) vary greatly, while lesser frequency variations may be indicative of less sticky soils. As such, in several embodiments, the controller 114 may be configured to determine the stickiness of the soil based on the organic matter content of the soil and the frequency(ies) of the first-order derivative(s) of the rotational speed(s) of the rotating ground-engaging component(s). In other embodiments, the controller 114 may be configured to determine the stickiness of the soil based on the moisture content of the soil and the frequency(ies) of the first-order derivative(s) of the rotational speed(s) of the rotating ground-engaging component(s). In further embodiments, the controller 114 may be configured to determine the stickiness of the soil based on the organic matter content of the soil, the moisture content of the soil, and the frequency(ies) of the first-order derivative(s) of the rotational speed(s) of the rotating ground-engaging component(s). For instance, the controller 114 may include a look-up table(s), suitable mathematical formula, and/or algorithms stored within its memory device(s) 118 that correlates the organic matter content of the soil, the moisture content of the soil, and the frequency(ies) of the first-order derivative(s) to the stickiness of the soil within the field. The determined soil stickiness data may then be stored within the memory device(s) 118 of the controller 114 or transmitted to the user interface 122 (e.g., via the communicative link 120) for display to the operator.

Figure 5:
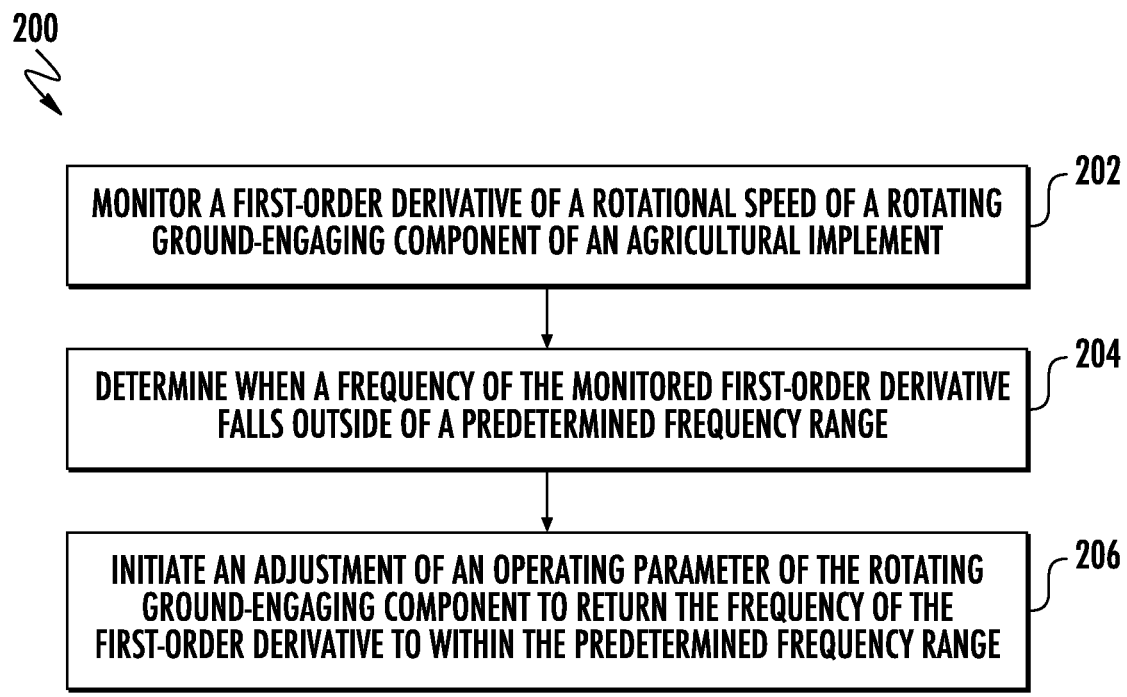
FIG. 5 illustrates a flow diagram of one embodiment of a method for controlling the operation of rotating ground-engaging components of an agricultural implement in accordance with aspects of the present subject matter.

Referring now to FIG. 5, a flow diagram of one embodiment of a method 200 for controlling the operation of rotating ground-engaging components of an agricultural implement is illustrated in accordance with aspects of the present subject matter. In general, the method 200 will be described herein with reference to the agricultural implement 10, the work vehicle 12, and the system 100 described above with reference to FIGS. 1-4. However, it should be appreciated by those of ordinary skill in the art that the disclosed method 200 may generally be implemented with any implement having any suitable implement configuration, any vehicle having any suitable vehicle configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring, with one or more computing devices, a first-order derivative of a rotational speed of a rotating ground-engaging component of an agricultural implement. For instance, as described above, the controller 114 may be configured to monitor the first-order derivative(s) of the rotational speed(s) of one or more rotating ground-engaging components of an agricultural implement 10 based on data received from one or more rotational speed sensors 112. In one embodiment, the rotating ground-engaging component(s) may include the gauge wheel(s) 56, the closing disc(s) 64, the press wheel(s) 72, and/or the residue removal wheel(s) 78 of the implement 10.

Additionally, at (204), the method 200 may include determining, with the one or more computing devices, when a frequency of the monitored first-order derivative falls outside of a predetermined frequency range. For instance, as described above, the controller 114 may be configured to determine when a frequency(ies) of the monitored first-order derivative(s) falls outside of an associated predetermined frequency range.

Moreover, as shown in FIG. 5, at (206), the method 200 may include initiating, with the one or more computing devices, an adjustment of an operating parameter of the rotating ground-engaging component to return the frequency of the first-order derivative to within the predetermined frequency range. For instance, as described above, the controller 114 may be configured to initiate an adjustment of one or more operating parameters of the rotating ground-engaging component(s) to return the frequency(ies) of the first-order derivative(s) to within the predetermined frequency range. In one embodiment, the operating parameter(s) may include the force applied to and/or the penetration depth of the rotating ground-engaging component(s).

It is to be understood that the steps of the method 200 are performed by the controller 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 114 described herein, such as the method 200, is implemented in software code or instructions which are tangibly stored on a tangible computer readable medium. The controller 114 loads the software code or instructions via a direct interface with the computer readable medium or via a wired and/or wireless network. Upon loading and executing such software code or instructions by the controller 114, the controller 114 may perform any of the functionality of the controller 114 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of rotating ground-engaging components of an agricultural implement, the system comprising:
   a rotating ground-engaging component configured to rotate relative to soil within a field as the agricultural implement is moved across the field;
   a rotational speed sensor configured to capture data indicative of a rotational speed of the rotating ground-engaging component; and
   a controller communicatively coupled to the rotational speed sensor, the controller configured to:
      monitor a first-order derivative of the rotational speed of the rotating ground-engaging component based on data received from the rotational speed sensor;
      determine when a frequency of the monitored first-order derivative falls outside of a predetermined frequency range; and
      initiate an adjustment of an operating parameter of the rotating ground-engaging component to return the frequency of the first-order derivative to within the predetermined frequency range.

2. The system of claim 1, wherein the operating parameter of the rotating ground-engaging component comprises at least one of a force applied to or a penetration depth of the rotating ground-engaging component.

3. The system of claim 1, wherein, after initiating the adjustment of the operating parameter of the rotating ground-engaging component, the controller is further configured to:
   continue monitoring the first-order derivative of the rotational speed of the rotating ground-engaging component based on the data received from the rotational speed sensor; and
   determine that the rotating ground-engaging component is plugged when the frequency of the monitored first-order derivative is zero.

4. The system of claim 3, wherein the controller is further configured to initiate a control action associated with de-plugging the rotating ground-engaging component when it is determined that the rotating ground-engaging component is plugged.

5. The system of claim 4, wherein the control action comprises notifying an operator of the agricultural implement that the rotating ground-engaging component is plugged.

6. The system of claim 4, wherein the control action comprises adjusting an operating parameter of the agricultural implement.

7. The system of claim 6, wherein the operating parameter of the agricultural implement comprises a ground speed of the agricultural implement.

8. The system of claim 6, wherein the operating parameter of the agricultural implement comprises at least one of a force applied to or a penetration depth of the rotating ground-engaging component.

9. The system of claim 1, further comprising:
   a soil moisture sensor configured to capture data indicative of a soil moisture content of the soil within the field, the controller communicatively coupled to the soil moisture sensor, the controller further configured to:
   determine the soil moisture content of the soil within the field based on data received from the soil moisture sensor;
   determine the frequency of the monitored first-order derivative; and
   determine a soil stickiness of the soil within the field based on the determined soil moisture content and the determined frequency.

10. The system of claim 1, further comprising:
    an organic matter sensor configured to capture data indicative of an organic matter content of the soil within the field, the controller communicatively coupled to the organic matter sensor, the controller further configured to:
    determine the organic matter content of the soil within the field based on data received from the organic matter sensor;
    determine the frequency of the monitored first-order derivative; and
    determine a soil stickiness of the soil within the field based on the determined organic matter content and the determined frequency.

11. A method for controlling the operation of rotating ground-engaging components of an agricultural implement, the agricultural implement including a rotating ground-engaging component configured to rotate relative to soil within a field as the agricultural implement is moved across the field, the method comprising:
    monitoring, with one or more computing devices, a first-order derivative of a rotational speed of the rotating ground-engaging component;

determining, with the one or more computing devices, when a frequency of the monitored first-order derivative falls outside of a predetermined frequency range; and initiating, with the one or more computing devices, an adjustment of a rotating ground-engaging component operating parameter to return the frequency of the first-order derivative to within the predetermined frequency range.

12. The method of claim 11, wherein the rotating ground-engaging component operating parameter comprises at least one of a force applied to or a penetration depth of the rotating ground-engaging component.

13. The method of claim 11, further comprising:

after adjusting the rotating ground-engaging component operating parameter, continuing monitoring, with the one or more computing devices, the first-order derivative of the rotational speed of the rotating ground-engaging component; and determining, with the one or more computing devices, that the rotating ground-engaging component is plugged when the frequency of the monitored first-order derivative is zero.

14. The method of claim 13, further comprising:

initiating, with the one or more computing devices, a control action associated with de-plugging the rotating ground-engaging component when it is determined that the rotating ground-engaging component is plugged.

15. The method of claim 14, wherein the control action comprises notifying an operator of the agricultural implement that the rotating ground-engaging component is plugged.

16. The method of claim 14, wherein the control action comprises adjusting an agricultural implement operating parameter.

17. The method of claim 16, wherein the agricultural implement operating parameter comprises a ground speed of the agricultural implement.

18. The method of claim 16, wherein the agricultural implement operating parameter comprises at least one of a force applied to or a penetration depth of the rotating ground-engaging component.

19. The method of claim 11, further comprising:

determining, with the one or more computing devices, a soil moisture content of the soil within the field;

determining, with the one or more computing devices, the frequency of the monitored first-order derivative; and determining, with the one or more computing devices, a soil stickiness of the soil within the field based on the determined soil moisture content and the determined frequency.

20. The method of claim 11, further comprising:

determining, with the one or more computing devices, the organic matter content of the soil within the field;

determining, with the one or more computing devices, the frequency of the monitored first-order derivative; and determining, with the one or more computing devices, a soil stickiness of the soil within the field based on the determined organic matter content and the determined frequency.

* * * * *